(12) United States Patent
Rabute

(10) Patent No.: US 11,136,936 B2
(45) Date of Patent: Oct. 5, 2021

(54) PISTON

(71) Applicant: Mahle International GmbH, Stuttgart (DE)

(72) Inventor: Remi D. Rabute, Eaubonne (FR)

(73) Assignee: MAHLE INTERNATIONAL GMBH

(*) Notice: Subject to any disclaimer, the term of this patent is extended or adjusted under 35 U.S.C. 154(b) by 0 days.

(21) Appl. No.: 16/472,743

(22) PCT Filed: Nov. 24, 2017

(86) PCT No.: PCT/EP2017/080394
§ 371 (c)(1),
(2) Date: Jun. 21, 2019

(87) PCT Pub. No.: WO2018/114224
PCT Pub. Date: Jun. 28, 2018

(65) Prior Publication Data
US 2021/0108593 A1 Apr. 15, 2021

(30) Foreign Application Priority Data
Dec. 21, 2016 (EP) ..................................... 16290246

(51) Int. Cl.
*F02F 3/28* (2006.01)
*F16J 9/20* (2006.01)
*F16J 9/22* (2006.01)

(52) U.S. Cl.
CPC .................. *F02F 3/28* (2013.01); *F16J 9/20* (2013.01); *F16J 9/22* (2013.01)

(58) Field of Classification Search
CPC .................... F02F 3/28; F16J 9/20; F16J 9/22
See application file for complete search history.

(56) References Cited

U.S. PATENT DOCUMENTS

| 2,047,806 | A | * | 7/1936 | Swanson | ..................... F16J 9/20 |
| | | | | | 277/455 |
| 4,815,429 | A | * | 3/1989 | Thornton | ................... F16J 9/20 |
| | | | | | 123/193.6 |

(Continued)

FOREIGN PATENT DOCUMENTS

| DE | 102014108973 A1 | 12/2015 |
| JP | S5773340 U * | 5/1982 |

(Continued)

*Primary Examiner* — Jacob M Amick
*Assistant Examiner* — Charles J Brauch
(74) *Attorney, Agent, or Firm* — Fishman Stewart PLLC

(57) ABSTRACT

A piston for an internal combustion engine may include a piston axis and a radial plane extending orthogonally thereto. The piston may further include a piston head having an outer circumferential face including at least one ring groove configured to receive a piston ring. The at least one ring groove may be arranged sloped to an outside in a radial direction. The at least one ring groove may be oriented at an angle $\alpha$ between $0.5° \leq \alpha \leq 2°$ obliquely with respect to the radial plane. The piston may also include at least one piston ring having a rectangular-like cross section with a plurality of rounded corner regions and an oblique outer flank. The oblique outer flank may differ from an inner flank of the at least one piston ring disposed opposite the oblique outer flank by an angle $\beta$ between $2° < \beta \leq 5°$.

20 Claims, 1 Drawing Sheet

(56) References Cited

U.S. PATENT DOCUMENTS

| | | | |
|---|---|---|---|
| 10,125,870 B2 | 11/2018 | Mittler et al. | |
| 2003/0150112 A1* | 8/2003 | Upadhya | B23P 13/02 29/888.041 |

FOREIGN PATENT DOCUMENTS

| | | |
|---|---|---|
| JP | S5773340 U | 5/1982 |
| JP | H0278863 U | 6/1990 |

* cited by examiner

PISTON

CROSS-REFERENCE TO RELATED APPLICATIONS

This application claims priority to International Patent Application No. PCT/EP2017/080394, filed on Nov. 24, 2017, and European Patent Application No. EP 16290246.4, filed on Dec. 21, 2016, the contents of both of which are hereby incorporated by reference in their entirety

TECHNICAL FIELD

The present invention relates to a piston for an internal combustion engine. Moreover, the invention relates to an internal combustion engine having at least one piston of this type.

BACKGROUND

From JP S57 73340 U a piston for an internal combustion engine is known, having a piston axis and a radial plane which runs orthogonally with respect thereto, with a piston head with an outer circumferential face with at least one ring groove to receive a piston ring, wherein the at least one ring groove is arranged so as to slope to the outside in the radial direction in the case of a piston having the piston head arranged at the top.

Internal combustion engines having pistons are well known and are used in virtually all current motor vehicles. In order for it to be possible here to regulate an oil film which is required for lubricating a piston in an associated cylinder and at the same time to prevent an undesired transfer of blow-by gases from the combustion chamber into the crankcase, what are known as piston rings are used. Here, piston rings of this type are usually trimmed for a high sealing action and, at the same time, a low oil consumption. In order to fulfil these divergent tasks, there are piston rings with convex outer flanks which can both fulfil their sealing function and can perform a regulation of the oil film both during an upward movement and during a downward movement of the piston. In addition, the frictional resistance of the respective piston ring on the cylinder wall can also be reduced by means of a convex outer flank of this type and, as a result, the wear resistance of the piston ring can be increased.

During the operation of the internal combustion engine, at least a piston head of the piston which faces a combustion chamber is heated to a pronounced effect which results in an oblique position of a ring groove which receives the respective piston ring on account of the associated thermal expansion. As a result, the piston ring contacts with a radially outer point of a groove wall of the ring groove. This in turn has the disadvantage that hot combustion exhaust gases can pass out of the combustion chamber into the ring groove and can flow under the piston ring there, as a result of which the said piston ring lifts up from its sealing point on the radially outer point of the groove flank, which leads firstly to an increased leak and secondly to an unstable behaviour of the piston ring. Both are disadvantageous and therefore undesired.

SUMMARY

The present invention is therefore concerned with the problem of specifying a piston overcoming the disadvantages which are known from the prior art, in particular in relation to a sealing action and stability of the piston ring in the associated ring groove.

According to the invention, the said problem is solved by way of the subject matter of the independent claim(s). Advantageous embodiments are the subject matter of the dependent claim(s).

The present invention is based on the general concept of introducing at least one ring groove of a piston which receives a piston ring obliquely into an outer circumferential face of the piston, obliquely meaning at an angle $\alpha$ with respect to the radial plane of the piston. Here, a radial plane of the piston runs orthogonally with respect to a piston axis. As a result of the ring groove which is made obliquely with respect to the radial plane of the piston, a sealing point of the piston ring can be shifted in the ring groove radially inwards, in particular to a rounded corner region of an inner flank of the piston ring, as a result of which, in particular, the flow under the piston ring of hot gases/combustion exhaust gases from the combustion chamber which has occurred up to now and is absolutely undesired, can be avoided. The piston according to the invention having said piston axis and said radial plane which runs orthogonally with respect thereto and a piston head with an outer circumferential face with the at least one ring groove for receiving a piston ring. Essential for the invention is that the at least one ring groove is oriented at an angle $\alpha$ between $0.5° \leq \alpha \leq 2°$ obliquely with respect to the radial plane of the piston and that the at least one ring groove is slopingly arranged to the outside in the radial direction in the case of a piston having the piston head arranged at the top. The mentioned angle range applies to a cold piston. Moreover the at least one piston ring according to the invention has a rectangular-like cross section with rounded corner regions and an oblique outer flank. Therefore, the piston according to the invention already has an oblique ring groove in the cold state, that is to say a ring groove which is oriented obliquely with respect to the radial plane of the piston. Although the oblique position of the said ring groove can still increase during operation of the internal combustion engine and during operation of the piston, this no longer has a negative influence on the sealing point, more precisely on a sealing circle, of the piston ring in the ring groove. Therefore, a piston can be provided, in which the sealing circle, which is formed from the contact of the piston ring with a groove flank of the ring groove, has a smaller radius than it was the case in pistons which are known from the prior art. In particular, a piston can be provided for the first time, in which the piston ring is already in contact with a groove flank of the ring groove in a corner region between an inner flank and a ring flank of the piston ring, as a result of which the flow of hot gas under the piston ring, which flows under high pressure out of the combustion chamber into the groove flank can be avoided.

According to the invention the stated angular range outlines a range, in which the effect according to the invention of shifting the sealing point or the sealing circle radially inwards takes place, the selection of the respective angle $\alpha$ being dependent on individual dimensions both of the ring groove and of the piston ring and also the materials which are used for the piston ring and/or the piston. Here, in particular, the material which is used for the piston is decisive for the thermal expansion which occurs during operation of the piston and therefore also for the resulting additional temperature-induced oblique position of the ring groove. The introduction of the oblique ring groove by means of a grinding tool or by means of a material-removing tool makes manufacturing of the ring groove highly precise, but at the same time simple and reliable. It is clear that merely only one ring groove of this type can be positioned obliquely, or all existing ring grooves on the piston.

Furthermore, the present invention is based on the general concept of using a piston in an internal combustion engine. Therefore, it is possible for the first time by means of a piston of this type to already achieve an oblique position of the ring groove in the cold piston, which oblique position is additionally increased during the operation of the internal combustion engine on account of the temperature which occurs. In particular, the flow of hot combustion gases under the piston ring which leads to an undesired blow-by effect can be avoided reliably via the oblique position of the at least one ring groove which can be made comparatively simply in an outer circumferential face of the piston. A sealing point or a sealing circle, that is to say a contact point or contact line of the piston ring on the associated groove flank of the ring groove, can be shifted further inwards, an improved rear flow of the piston ring being made possible at the same time by way of the oblique position of the ring groove, as a result of which the said piston ring is pressed by the hot combustion gases from the combustion chamber against the cylinder wall and as a result an improved sealing action can be achieved. Therefore, by way of the obliquely positioned ring groove with the piston ring with the rectangular-like cross section with rounded corner regions and an oblique outer flank, the sealing action can be reinforced by way of utilization of the pressure of the hot combustion exhaust gases, but a blow-by effect can be reliably avoided by way of prevention of the flow under the piston ring. Here, the two groove flanks of the ring groove preferably run parallel to one another.

The at least one ring groove is arranged so as to slope to the outside in the case of a piston having a piston head which is arranged at the top. The arrangement of the ring groove so as to slope to the outside makes the above-described effects possible, namely, in particular, the assisting action of the pressing by the combustion exhaust gases and the prevention of the flow under the piston ring, as a result of which the said piston ring remains in a more stable manner.

The piston according to the invention has at least one piston ring with a rectangular-like cross section with rounded corner regions and an oblique outer flank. Thereby a sliding and/or frictional resistance of the piston ring on the cylinder can be reduced and it is also possible to improve the regulation of a thickness of an oil film on the cylinder wall at the same time on account of the oblique position, which both have a beneficial effect on the wear resistance and functionality of the internal combustion engine.

According to the invention, the oblique outer flank expediently differs from an inner flank of the piston ring which lies opposite by an angle $\beta$ between $2°\leq\beta\leq5°$. The following advantages can be achieved by way of an angular range which is selected in this way: firstly, the piston ring comes into contact via its outer flank with the cylinder wall merely at a point or along a circular segment, as a result of which the frictional or sliding resistance can be reduced. Here, the contact point or the contact line lies in a rounded corner region, as a result of which favourable regulation of the oil film thickness can be achieved both during an upward movement and during a downward movement of the piston.

In one advantageous development the at least one ring groove having two parallel running groove flanks. Thus a manufacturing process can be simplified.

Further important features and advantages of the invention arise from the subclaims, from the drawings and from the associated description of the figures using the drawings.

It goes without saying that the features which are mentioned in the above text and are still to be explained in the following text can be used not only in the respectively specified combination, but rather also in other combinations or on their own, without departing from the scope of the present invention.

Preferred exemplary embodiments of the invention are shown in the drawings and will be explained in greater detail in the following description, identical reference numerals relating to identical or similar or functionally identical components.

DETAILED DESCRIPTION

Figure 1:
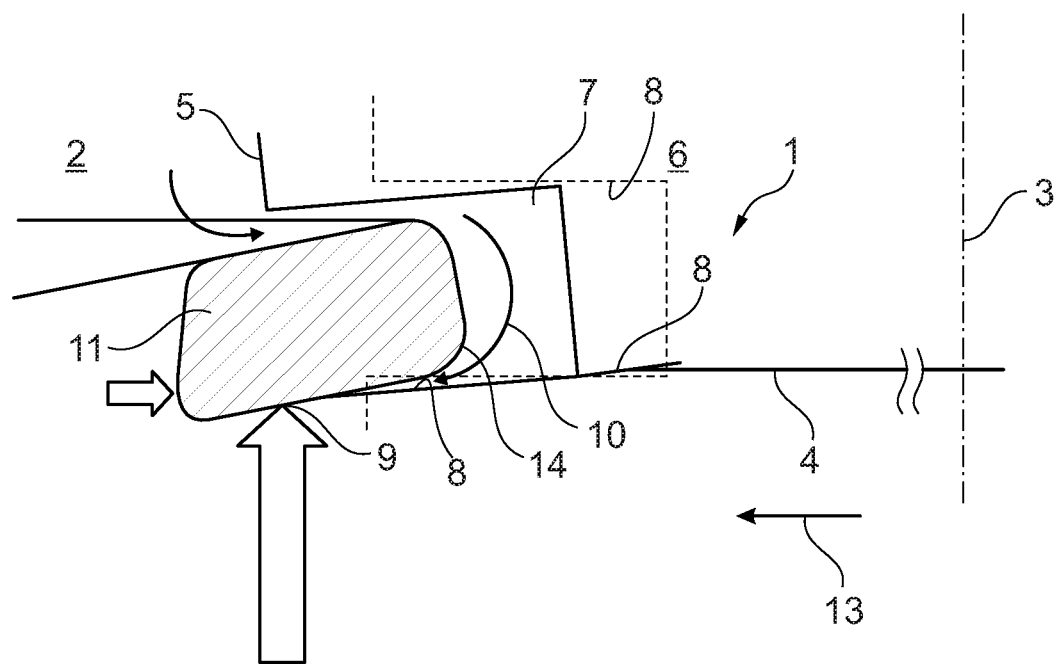
FIG. 1 shows a sectional illustration through an internal combustion engine in the region of a ring groove of a piston according to the prior art.
Figure 2:
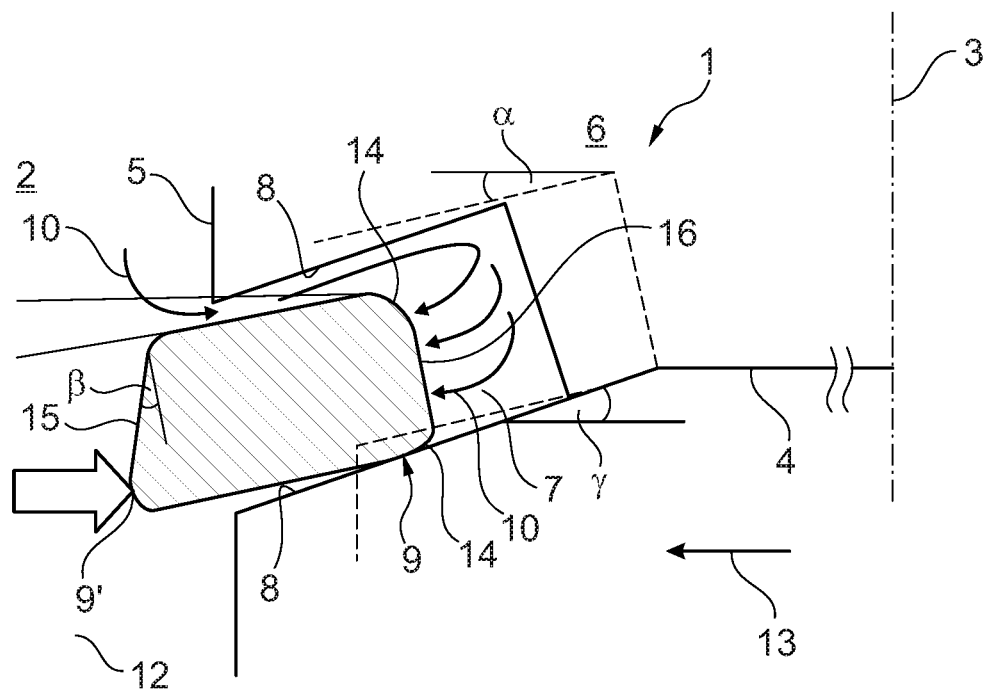
FIG. 2 shows an illustration as in FIG. 1, but in the case of a ring groove and a ring outer diameter (OD) profile according to the invention.

According to FIGS. 1 and 2, a piston 1 of an internal combustion engine 2 has a piston axis 3 and a radial plane 4 which runs orthogonally with respect thereto. At least one ring groove 7 is arranged on an outer circumferential face 5 of a piston head 6, which ring groove 7 runs with its groove flanks 8 parallel to the radial plane 4 in the cold state in the case of the piston 1 which is shown in FIG. 1 and is gathered from the prior art. Here, according to FIG. 1, the ring groove 7 in the case of a cold piston 1 is illustrated by way of a dashed line. In the case of a piston 1 which is in operation, however, the ring groove 7 is positioned obliquely on account of the temperature expansion, as a result of which a sealing point 9 between a piston ring 11 and a groove flank 8 of the ring groove 7 is moved to a radially outer point of the groove flank 8. Here, FIG. 1 shows the ring groove 7 which is positioned obliquely on account of the temperature expansion using a solid line. During the operation of the internal combustion engine 2, however, the outer sealing point 9 brings about a flow under the piston ring 11 of combustion exhaust gases 10 which come from a combustion chamber (not shown), as a result of which, in the most unfavourable case, lifting of the piston ring 11 from the lower groove flank 8 of the ring groove 7 and therefore an undesired bypass flow of combustion exhaust gases 10 through the ring groove 7 can take place.

If the piston 1 according to the invention is then regarded according to FIG. 2, it can be seen from it that the ring groove 7 already has an oblique position even in the cold state (dashed line), that is to say is arranged obliquely with respect to the radial plane 4 of the piston 1, the ring groove 7 being arranged or grounded or introduced by means of a material-removing tool obliquely by the angle $\alpha$ with respect to the radial plane 4. Here, the at least one ring groove 7 is oriented obliquely with respect to the radial plane 4 of the piston 1 by an angle $\alpha$ between preferably $0.5°\leq\alpha\leq2°$. During operation of the internal combustion engine 2, said oblique position is increased again on account of the temperature expansion, which results in an oblique position of the ring groove 7 by an angle $\gamma$ in the case of a warm or heated piston 1. The said angle $\gamma$ is greater than the angle $\alpha$.

As can clearly be gathered from FIG. 2, however, the sealing point 9 moves radially inwards, as a result of which, in particular, a flow under the piston ring 1 of combustion exhaust gases 10 which flow into the ring groove 7 from the combustion chamber can be avoided conclusively. Rather, in the case of the ring groove 7 which is oriented according to the invention in accordance with FIG. 2, the combustion exhaust gases 10 which flow into the ring groove 7 cause both the piston ring 11 to be pressed onto a cylinder wall 12, and the piston ring 11 to be pressed with its sealing point onto the groove flank 8. Here, in the case of a piston 1 having a piston head 6 which is arranged at the top, the at least one ring groove 7 is arranged so as to slope to the outside, that is to say to the outside in the radial direction 13. Here, the two groove flanks 8 runs parallel.

If the piston ring 11 which is used is regarded, it can be seen that it has a rectangular-like cross section with rounded corner regions 14 and an oblique outer flank 15. Here, the oblique outer flank 15 differs from an inner flank 16 which lies opposite by an angle $\beta$ between $2°\leq\beta\leq5°$. The oblique outer flank 15 can achieve a situation where the piston ring 11 bears against the cylinder wall 12 over merely a sealing point 9' or, as viewed completely, over a sealing circle, and is guided on the cylinder wall 12 with comparatively low frictional or sliding resistance as a result.

In general, both the risk of an undesired blow-by flow can be prevented and the stability of the piston ring 11 can be improved by way of the ring groove 7 which is already introduced obliquely according to the invention in the cold state, since a flow under the piston ring 11, as shown according to FIG. 1, is then avoided (cf. FIG. 2). Here, the introduction of the ring groove 7 can take place, for example, by means of grinding or by means of a material-removing tool.

The invention claimed is:

1. A piston for an internal combustion engine, comprising:
a piston axis and a radial plane extending orthogonally thereto;
a piston head having an outer circumferential face including at least one ring groove configured to receive a piston ring;
the at least one ring groove arranged sloped to an outside in a radial direction and the piston head arranged at a top;
the at least one ring groove oriented at an angle $\alpha$ between $0.5°\leq\alpha\leq2°$ obliquely with respect to the radial plane;
at least one piston ring having a rectangular-like cross section with a plurality of rounded corner regions and an oblique outer flank; and
wherein the oblique outer flank differs from an inner flank which lies opposite by an angle $\beta$ between $2°<\beta\leq5°$.

2. The piston according to claim 1, wherein the at least one ring groove is at least one of grounded in and formed via a material-removing tool.

3. The piston according to claim 1, wherein the at least one ring groove has two parallel running groove flanks.

4. The piston according to claim 1, wherein a sealing point is arranged in an area of at least one of the plurality of rounded corner regions.

5. An internal combustion engine comprising at least one piston including:
a piston axis and a radial plane extending orthogonally thereto;
a piston head having an outer circumferential face including at least one ring groove configured to receive a piston ring;
the at least one ring groove arranged sloped to an outside in a radial direction and the piston head arranged at a top;
the at least one ring groove oriented at an angle $\alpha$ between $0.5°\leq\alpha\leq2°$ obliquely with respect to the radial plane;
at least one piston ring having a rectangular-like cross section with a plurality of rounded corner regions and an oblique outer flank; and
wherein the oblique outer flank differs from an inner flank of the at least one piston ring disposed opposite the oblique outer flank by an angle $\theta$ between $2°<\beta\leq5°$; and
wherein the angle $\theta$ is greater than the angle $\alpha$.

6. The internal combustion engine according to claim 5, wherein the at least one ring groove is at least one of grounded in and formed via a material-removing tool.

7. The internal combustion engine according to claim 5, wherein the at least one ring groove has two parallel running groove flanks.

8. The internal combustion engine according to claim 5, wherein the at least one ring groove is grounded in the outer circumferential face.

9. The internal combustion engine according to claim 5, wherein the at least one ring groove is disposed in the outer circumferential face via a material-removing tool.

10. The internal combustion engine according to claim 5, wherein, at least during a combustion stroke, the at least one piston ring contacts a flank of the at least one ring groove at a sealing point disposed in an area of at least one of the plurality of rounded corner regions such that an axial ring flank of the at least one piston ring and the flank of the at least one ring groove extend transversely relative to one another.

11. The internal combustion engine according to claim 5, wherein the at least one ring groove is sloped axially away from the piston head in a radially outward direction relative to the piston axis.

12. The piston according to claim 1, wherein the at least one ring groove is grounded in the outer circumferential face.

13. The piston according to claim 1, wherein the at least one ring groove is disposed in the outer circumferential face via a material-removing tool.

14. The piston according to claim 1, wherein, at least during a combustion stroke, the at least one piston ring contacts a flank of the at least one ring groove at a sealing point disposed in an area of at least one of the plurality of rounded corner regions such that an axial ring flank of the at least one piston ring and the flank of the at least one ring groove extend transversely relative to one another.

15. The piston according to claim 1, wherein the at least one ring groove is sloped axially away from the piston head in a radially outward direction relative to the piston axis.

16. A piston for an internal combustion engine, comprising:
a piston axis and a radial plane extending orthogonally thereto;
a piston head arranged at a top and having an outer circumferential face including at least one ring groove configured to receive a piston ring;
the at least one ring groove having a first axial groove flank and a second axial groove flank extending parallel to one another;
the at least one ring groove disposed at an angle $\alpha$ of $0.5°\leq\alpha\leq2°$ with respect to the radial plane;
at least one piston ring having a rectangular-like cross section with a plurality of rounded corner regions disposed between and connecting a first axial ring flank, a second axial ring flank disposed opposite the first ring flank, an outer radial ring flank, and an inner radial ring flank disposed opposite the outer ring flank;

wherein the outer ring flank extends obliquely relative to the inner ring flank by an angle β of 2°<β≤5°; and wherein at least one rounded corner region of the plurality of rounded corner regions of the at least one piston ring contacts the first groove flank defining a sealing point.

17. The piston according to claim 16, wherein:

the sealing point is disposed spaced apart from a point where the first groove flank adjoins the outer circumferential face of the piston head; and the first ring flank and the first groove flank are disposed spaced apart from and facing one another at least during a combustion stroke.

18. The piston according to claim 1, wherein:

the piston head is composed of a thermally expandable material;

the at least one ring groove is oriented at the angle α when the piston head is in a cold state;

the at least one ring groove is oriented at an angle γ relative to the radial plan when the piston head is in an expanded, warm state; and the angle γ is greater than the angle α.

19. The piston according to claim 15, wherein:

the at least one ring groove has a first axial groove flank and a second axial groove flank extending parallel to one another, the first groove flank disposed axially farther from the piston head than the second groove flank;

the at least one piston ring has a first axial ring flank and a second axial ring flank disposed opposite the first ring flank; and at least one rounded corner region of the plurality of rounded corner regions of the at least one piston ring contacts the first groove flank at a sealing point that is disposed spaced apart from a point where the first groove flank adjoins the outer circumferential face of the piston head such that the first ring flank and the first groove flank extend transversely relative to one another.

20. The piston according to claim 19, wherein the first ring flank and the first groove flank are disposed spaced apart from and facing one another when the at least one rounded corner region contacts the first groove flank to define the sealing point.

* * * * *